3,697,306
BONDING COATINGS, DYES AND ADHESIVES TO SUBSTRATES
George T. Miller, Lewiston, N.Y., assignor to Hooker Chemical Corporation, Niagara Falls, N.Y.
No Drawing. Filed Nov. 17, 1969, Ser. No. 877,491
Int. Cl. B44d 1/092
U.C. Cl. 117—47 A          9 Claims

ABSTRACT OF THE DISCLOSURE

Organic coating compositions, e.g., siccative coatings such as paints, varnishes, enamels, lacquers, inks and the like, dyes, adhesives, and the like, can be applied to substrates which have been subjected to elemental phosphorus, partially oxidized and therafter washed with water.

BACKGROUND OF THE INVENTION

There has been a rapidly increasing demand for articles such as plastics and other materials that have decorative and protective coatings. Such articles are in demand in industries as automotive, home appliance, radio and television and for use in decorative containers and the like. Heretofore, obtaining good adhesion between the organic coating compositions or organic films such as paints, lacquers, varnishes, enamels, inks and the like, and the substrate, especially plastics, has been a problem. Additionally, many substrates, e.g., polypropylene, are notorious for their lack of ability to accept dyes and adhesives.

It is an object of this invention to provide a process for applying organic coating compositions, or organic films, to substrates. It is another object of this invention to provide a process for adherently applying a protective or decorative coating to substrates. A further object to provide a process whereby substrates are rendered susceptible to bonding with organic coating compositions, or organic films. Still another object of the invention is to provide articles having a protective or decorative coating thereon. Other objects will become apparent to those skilled in the art from the following detailed description.

SUMMARY OF THE INVENTION

This invention relates to a process for applying organic coating compositions or organic films to substrates and to the products thereof. More particularly, the invention relates to a process for applying organic coating compositions or organic films such as siccative coatings, dyes, adhesives, and the like to substrates which have been subjected to elemental phosphorus, partially oxidized and thereafter washed with water.

DESCRIPTION OF THE PREFERRED EMBODIMENTS

The process of this invention is applicable to substrates such as synthetic plastics and to other substantially non-metallic substrates.

Typical polymers to which the process of this invention is applicable include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene with other olefins, polybutadiene; polymers of butadiene; polyisoprene, polystyrene and polymers of pentene, hexene, cyclopentadiene, methylstyrene, and the like. Other polymers useful in the invention include chlorinated polypropylene and methylene; polyindene, indenecoumarone resins; polymers of acrylate esters and polymers of methacrylate esters, acrylate and methacrylate resins such as ethyl acrylate; alkyd resins; cellulose derivatives such as cellulose acetate; cellulose acetate butyrate, cellulose nitrate, ethyl cellulose; epoxy resins; furan resins (furfuryl alcohol or furfural ketone); hydrocarbon resins from petroleum, isobutylene resins (polyisobutylene); isocyanate resins (polyurethanes); polyurea resins; melamine resins such as melamine-formaldehyde; oleo-resins, phenolic resins such as phenol-formaldehyde; polyamide polymers, such as polyamides, poly-amideepoxy and particularly long chain synthetic polymeric amides containing recurring carbonamide groups as an integral part of the main polymer chain; polyester resins such as unsaturated polyesters of dibasic acids and dihydroxy compounds; and polyester elastomer and resorcinol resins such as resorcinol-formaldehyde; rubbers such as natural rubber, synthetic polyisoprene reclaimed rubber, chlorinated rubber, polybutadiene; polysulfides (Thiokol); terpene resins; urea resins; vinyl resins such as polymers of vinyl acetal; polyvinylchloride; polyformadeldehyde; polyphenylene oxide; polymers of diallylphthalates and phthalates; polycarbonates or phosgene or thiophosgene and dihydroxy compounds such as bisphenols, thermoplastic polymers of bisphenols and epichlorohydrin (trade named Phenoxy polymers); graft copolymers of polymers of unsaturated hydrocarbons and an unsaturated monomer, such as graft copolymers of polybutadiene, styrene and acrylonitrile, commonly called ABS resin; ABS-polyvinylchloride polymers, recently introduced under the trade name of Cycovin; and acrylic polyvinyl chloride polymers, known by the trade name of Kydex 100.

The polymers can be used in the unfilled condition, or with fillers such as glass fiber, glass powder, glass beads, asbestos, talc and other mineral filler, wood flour and other vegetable fillers, carbon in its various forms, dyes, pigments, waxes and the like.

The substrates can be in various physical forms, such as shaped articles for example, moldings, sheets, rods, and the like; fibers, films, and fabrics, and the like of various thickness.

In the first step of the process of this invention, the substrate is subjected to elemental white phosphorus, which includes the various impure or commercial grades sometimes referred to as yellow phosphorus. The phosphorus can be utilized in the vapor phase, as a liquid or dissolved in a solvent. Suitable solvents or diluents for the elemental phosphorus are solvents that dissolve elemental phosphorus and which preferably swell the surface of a plastic without detrimentally affecting the surface of the plastic. Such solvents include halogenated hydrocarbons and halocarbons such as chloroform, methyl chloroform, phenyl chloroform, dichloroethylene, trichloroethylene, perchloroethylene, trichloroethane, dichloropropane, ethyl dibromide, ethyl chlorobromide, propylene dibromide, monochlorobenzene, monochlorotoluene and the like; aromatic hydrocarbons such as benzene, toluene, xylene, ethylene benzene, naphthalene and the like.

When a solution of phosphorus is employed in the process, the solution concentration is generally in the range from about 0.0001 weight percent of phosphorus based on the weight of the solution up to a saturated solution and preferably from about 0.1 to about 2.5 percent. Prior to subjecting the substrate to the elemental phosphorus, in gaseous, liquid or solution, the surface of the article should be clean. When a solution is used, the solvent generally serves to clean the surface. A solvent wash may be desirable when gaseous or liquid phosphous is employed. However, it is not necessary to subject the substrate to special treatment such as etching, polishing and the like. The phosphorus treatment is generally conducted at a temperature below the softening point of the substrate, and below the boiling point of the solvent, if a solvent is used. Generally, the temperature is in the range of about 10 to about 135 degrees centigrade, but preferably in the range of about 10 to about 100 degrees centigrade. The contact time varies depending on the nature of the substrate, the solvent and temperature, but is generally in the range of about one second to one hour or more, preferably in the range of about 1 to 10 minutes.

As a result of the first treatment step, the phosphorus is deposited or nucleated at the surface of the substrate. By this is meant that the phosphorus can be located on the surface, embedded in the surface and embedded beneath the surface of the substrate. The location of the phosphorus is somewhat dependent upon the action of the solvent and the reaction conditions on the surface.

In the second and third treatment steps of the process of this invention, the phosphorus-treated substrate is partially oxidized and then subjected to hydrolysis preferably by exposure to the atmosphere and then subjection to water. As a result of these treatments, the substrate becomes hydrophilic. Each substrate requires a different time sequence of air-drying and water washing to become hydrophilic. For example, the time sequence employed in exposing phosphorus-treated polypropylene to air and to water may not be sufficient to render polyethylene hydrophilic. However, one skilled in the art can readily determine the optimum duration of time for exposure to the atmosphere and water washing for each substrate. In general, the phosphorus-treated substrate is exposed to the atmosphere for about 1 second to about 60 minutes, preferably 0.5 to 10 minutes, and washed with water for about 5 seconds to about 24 hours, preferably 1 to 30 minutes. The air exposure and water washing can be effected at ambient temperatures. Without being limited to theory, it is believed that upon exposure to air, the deposited phosphorus begins to oxidize and the surface of the substrates becomes hydrophilic. When the article is subjected to the water, the article obtains a protective coating which substantially halts the oxidation process. If desired, the oxidation step can be accomplished by oxidants other than air such as oxygen, hydrogen peroxide, sodium peroxide, potassium dichromate, potassium permangamate, and the like, and the hydrolysis can be accomplished in an aqueous solution or suspension such as a water-based paint, latex paint or dye or by a polar material such as alcohol and like materials apparent to one skilled in the art.

Organic coatings or organic films can be adherently bonded to the hydrophilic substrates resulting from the third treatment step. The organic coatings or organic films include siccative coatings, dyes, adhesives and the like. The siccative coating compositions used in the practice of this invention are often referred to as paint (oil and latex based), lacquers, varnishes, enamels and similar protective and decorative coatings. They are characterized by being comprised of a volatile or solvent portion and a nonvolatile or film forming portion. The volatile or solvent portion of the composition may be a conventional solvent such as toluene, xylene, mineral spirits, kerosene, alcohols, esters such as ethyl acetate or naphtha, or more desirably for elevated temperature applications, substantially non-flammable halogenated aliphatic hydrocarbon solvents. Examples of halogenated solvents include trichloroethylene, perchloroethylene, the trichloroethanes, tetrachloroethane, ethylene chloride, ethylene dichloride, ethylidene chloride, the dichlorotetrafluoroethanes, the trichlorotetrafluoroethanes, the trichlorodifluoroethanes, the tetrachlorodifluoroethanes, the fluorotrichloroethanes, the fluorotetrachloroethanes, methyltrifluoroethylene, 1,2,-dichloropropane, 1,2-dichloropropene, 1,1,2-trichloropropane, ethyltrichloroethylene and mixtures thereof as well as other halogenated compounds similar in property to those recited above. As can be noted, these materials are often of about 1 to 4 carbon atoms and about 1 to 6 halogen atoms.

The nonvolatile or film forming portion of the siccative coating composition may be organic and/or inorganic. Normally, coating compositions such as paints, lacquers and varnishes contain both organic and inorganic materials. The primary requirement of the coating composition is that it be compatible with the solvent used.

The particular film forming materials used can be either the thermoplastic or thermosetting type. These include film forming vehicles hardened by mere evaporation of solvent, as well as those requiring a subsequent curing step to completely harden the vehicle. Most preferred vehicles are those which quickly assume a fixed adherent film after withdrawing from the coating composition. Such vehicles include varnishes, lacquers, enamels, alkyds, epoxy oils, epoxy resins, phenolic resins, phenolic modified resins, drying oils and the like, in addition to various modifications thereof.

The siccative coating compositions are generally maintained between about 20 and about 146 degrees centigrade and can contain pigments and/or coloring agents, fillers and the like insoluble materials. Typical pigments and/or coloring agents conventionally employed in coating compositions are chrome yellow, chrome green, zinc yellow, molybdate orange, hansa yellow, the iron blues, the iron yellows, the iron reds, titanium dioxide, zinc oxide, toluidiene red, peacock blue and the like. The coating compositions can be applied by roller coater, brush, spraying, dipping or other conventional means of application known in the art.

Ink is another type of siccative coating composition which can be used in the practice of this invention. The inks are normally a mixture of a finely divided pigment such as carbon black suspended in a drying oil such as linseed oil. Frequently, the compositions contain alkyds, phenol-formaldehyde or other synthetic resins and cobalt, manganese and lead salts to promote rapid drying by oxidation and polymerization. Mineral oils are sometimes used. Inks which dry by evaporation of a volatile solvent, such as those disclosed hereinbefore, rather than by oxidation and polymerization of a drying oil or resin can be employed in this invention. Additionally, colored inks, i.e. incorporating pigments or coloring agents such as those described hereinbefore, can also be employed.

The substrates treated by the process of this invention can be bonded to one another and to other materials by means of adhesives. Typical adhesives include thermosetting resins such as urea, melamine, phenol, resorcinol, furan, epoxy, polyurethane, and unsaturated polyester resins; thermoplastic resins such as cellulose esters and ethers, acrylic esters, polyamides, polystyrene, synthetic elastomers, poly(vinyl alcohol); starch and dextrins; animal glues (e.g., bone glue, hide glue), blood; casein; asphalt; shellac; natural rubber; sodium silicate; and the like adhesives. The adhesive compositions can be applied to the treated substrates and caused to harden in the conventional matter, e.g., by polymerization, oxidation, vulcanization, gellation, hydration, evaporation of volatile constituents and reduction of pressure or cooling below the softening range.

The dyes that are employed in this invention are usually a colored organic compound or mixture which can be applied and give color to the treated substrate in a reasonably permanent fashion. Most dyes of commercial importance are synthesized from aromatic hydrocarbon (coal-tar dyes) and related material. They are classified according to chemical composition and also according to the way in which they behave during application. Thus, a dye can belong to one of the following chemical classes: nitroso; nitro; monazo, disazo, trisazo, polyazo, azoic, stilbene, diphenolmethane, triarylmethane, xanthene, acridine, quinoline, methine, thiazole, indamine, indophenol, azine, oxazine, thiazine, sulfur, lactune, aminoketone, hydroxyketone, anthraquinone, indigoid, phthalocyanine, and natural (i.e. obtained from animal or vegetable matter with little or no chemical processing such as curcuma, carmine, litmus, indigo, chlorophyll and walnut oil). The dyes can be classified according to the way they behave during application as follows: vat, direct, acid and sulfur dyes, fluorescent brighteners, mordant, solvent, dispersed, basic, food, drug and cosmetic dyes. The most important chemical types are the azo, anthraquinone, sulfur, indigoid and stilbene dyes. Some typical dyes which can be used in this invention include chrysamine G; para red, chichage, bluesics B; methyl orange; congo red; azobenzene; azoxypenzene; alizarin; indanthrene indanthrene golden yellow GK; and the like.

The following examples serve to illustrate the invention but are not intended to limit it. Unless otherwise specified in this specification and claims, all temperatures are in degrees centigrade and all parts are understood and expressed in parts by weight.

EXAMPLE 1

Four samples of polypropylene were subjected to a 1.5 percent solution of white phosphorus in trichloroethylene at 52–53 degrees centigrade for 30 seconds and then exposed to air for 30 seconds. The first sample was washed with water for 30 seconds and it was observed that the surface was hydrophobic. The second sample was washed with water for 1 minute and it was found that the surface was lightly wetted in spots. The third sample was washed with water for two minutes and found to be almost completely hydrophilic. The fourth sample was washed with water for 4 minutes whereupon it was completely hydrophilic and found to wet evenly after being dried.

EXAMPLES 2–3

Polypropylene plaques were subjected to a 0.5 percent solution of white phosphorus in trichloroethylene at 54 degrees centigrade for 1 minute, air-dried for 1 minute and washed with water for 1 minute. After 1¼ minutes had elapsed from the end of the water wash, Velvet Suede flat wall paint (water base) was applied. The adhesion of the paint to the test sample was better than the adhesion of the paint to a sample of untreated polypropylene. Toco semi-gloss coral pink (organic base) was applied to a treated polypropylene plaque about 3 minutes after the water washing was complete to form an adherent coating thereon.

EXAMPLES 4–7

Samples of polypropylene were subjected to a saturated solution of white phosphorus in trichloroethylene at 55 degrees centigrade for 1 minute, air-dried for 1 minute and washed with water for 1 minute. Thereafter, the following siccative coatings were applied to the treated substrate and also to an untreated substrate as a control. In each instance, the adhesion of the coating on the treated sample was better than the adhesion of the siccative coating on the control sample.

TABLE I

| Example No.: | Siccative coating composition |
| --- | --- |
| 4 | Krylon Pastel Yellow Spray Enamel No. 1802. |
| 5 | ACB primer (oleo resinous phenolic). |
| 6 | Indo shellac. |
| 7 | Preparakote (an alkyd resin type primer). |

EXAMPLE 8

A sample of polypropylene was subjected to a 1.5 percent solution of yellow phosphorus in trichloroethylene at 55 degrees centigrade for 1 minute, air-dried for 1 minute, and washed with water from 1 minute. The treated plastic was written upon with a ball-point pen and the writing was difficult to rub off.

EXAMPLES 9–11

Commercial polyurethane and epoxy cements were applied to the surface of three samples of polypropylene and the adhesives were allowed to set overnight. In Example 9, an untreated sample of the plastic was employed. The epoxy cement did not have any adhesion to the plastic. The polyurethane had shrunk to about one-third of the original area of the surface which it covered and could be lifted from the plastic with practically no evidence of adhesion. In Example 10, a sample of polypropylene which had been passed through a flame was employed. The epoxy adhesive had not set properly and the polyurethane adhesive had shrunk to about one-half of its original area. The polyurethane adhesive exhibited some adherence to the polypropylene but still could be easily lifted from the plastic. In Example 11, the plastic had been pretreated by subjection for 30 seconds in a 1.5 percent solution of white phosphorus in trichloroethylene at 52–53 degrees centigrade, air-dried at room temperature for 30 seconds and washed with water for 4 minutes. The epoxy and polyurethane adhesives exhibited substantial adhesion to the plastic. The polyurethane had shrunk in thickness but not in area.

EXAMPLE 12

Two pieces of polypropylene were pretreated as described in Example 11 and patted dry. After about 2½ minutes had elapsed, an epoxy adhesive was applied to the ends of the treated samples which were then clamped together with a spring clamp. In a similar fashion, two samples of untreated polypropylene were glued together as a control. After the adhesive had set, the samples were tested on an Instron tester. The control broke at 15 pounds. The pretreated sample broke at 81 pounds and showed evidence of plastic-plastic failure together with failure of the adhesive.

EXAMPLE 13

Example 12 was repeated employing a polyurethane adhesive in place of the epoxy adhesive. A duplicate and two control experiments were performed simultaneously. After the adhesive had set, the samples were tested on an Instron tester. The control samples broke at 9 and 17.5 pounds and the pretreated samples broke at 73 and 81 pounds.

EXAMPLE 14

A sample of polypropylene was subjected to a 1.5 percent solution of white phosphorus in trichloroethylene for 30 seconds at 54 degrees centigrade, air-dried for 30 seconds, washed with water for 2 minutes and patted dry. The treated plastic and a sample of untreated plastic were immersed in Textile Institute TIS Stain #2, an aqueous acid (acetic) dye, at room temperature for 5 minutes and thereafter washed for 2 minutes in water. The untreated sample was unaffected and the treated sample had obtained a pale pink color. Treated and untreated plastic were immersed in boiling dye solution for 5 minutes and washed with water for 2 minutes. The untreated sample had become a pale purple but the color could be wiped off. The treated sample was a darker purple than the control and the color could not be wiped off.

The foregoing was repeated employing polypropylene cloth to obtain similar results.

EXAMPLE 15

A dye dispersion was made by adding 2.5 cc. of 10 percent Nacconal to 0.5 gram of Polymal Blue, a dispersed dye, and thereafter adding 100 cc. of boiling water and stirring to a complete dispersion. The dye dispersion was diluted to 250 cc. Two polypropylene samples were prepared as follows. A control sample was scoured for 5 minutes in a 0.5 percent Triton X–100 solution at 180° F. and rinsed. A second polypropylene sample was pretreated as described in Example 14 except that the water wash was for 1 minute. Both plastic samples were immersed for 10 minutes in a dye bath containing 270 cc. of water at 120° F. and 30 cc. of a 3 percent Du Pont Latyl Carrier A dispersion and thereafter 100 cc. of the dye dispersion was added. The temperature of the bath was gradually raised to 90–95 degrees centigrade and total exposure to the bath was 1½ hours. A third polypropylene sample was pretreated as described in Example 14 except that the water wash was for 1 minute and placed in the dye bath after the carrier and dye dispersion had been mixed. All of the plastic samples took the dye but the samples pretreated by the process of this invention took the dye best. The third polypropylene sample was the most deeply stained. The surfaces of the control and third polypropylene samples were cut into and examined under a microscope. The stain in the third polypropylene sample had reached deeper into the plastic than the control.

EXAMPLE 16

A dye bath was prepared by dissolving 0.5 gram of sodium carbonate in 500 cc. of water and thereafter adding a dye solution prepared by adding 15 grams of boiling water to 1 gram of Phenazo Brown R, a triazo type direct developed dye, and stirring. A control polypropylene sample and a polypropylene sample which had been pretreated as described in Example 15 were immersed in the dye bath which was maintained at about 90–95 degrees centigrade. 2.5 gram quantities of sodium carbonate were added at the 5, 15, 30 and 45 minute mark of the total immersion time of 1 hour. The plastic samples were removed and rinsed. Thereafter the samples were placed in a solution of 3.2 percent sodium nitrate and 3.2 percent sulfuric acid at room temperature for 20 minutes and then rinsed. The samples were then subjected to a 2 percent solution of Developer AMS–CF for 20 minutes at rom temperautre and rinsed. Both samples had obtained a tan color but the pretreated polypropylene samples were twice as dark as the control. The dye would not rub off.

Similar results were obtained when polypropylene cloth was treated by the above described dyeing procedure. The polypropylene cloth had been pretreated by immersion for 1 minute in a 0.5 percent solution of yellow phosphorus and trichloroethylene at 54 degrees centigrade, air dried for 9 minutes and then washed with water for 2 minutes.

EXAMPLE 17

After 1 minute had elapsed from the end of the water washing step of a polypropylene sample which had been pretreated as described in Example 14, the plastic sample was immersed in a dye for 10 minutes at 58–63 degrees centigrade. The dye bath contained 3 percent sodium hydroxide and 10 percent Sandothrene Yellow NGC Paste Ultrasperse, an anthaquinone type vat dye. The absorbed dye could not be removed when the thus-treated polypropylene sample was rubbed.

EXAMPLE 18

A polypropylene sample was pretreated as described in Example 15. 15 seconds after the water rinse step, the sample was immersed for 1 minute in a 70 degree centigrade dye bath containing a 1 percent aqueous solution of Cibacron Blue 3G, a monochloro trizinyl derivative of an anthaquinone fiber reactive dye. The thus-treated sample was air dried for 6 minutes and then immersed for 10 minutes in a boiling fixer solution containing 2 percent trisodium phosphate and 13.2 percent Glauber's salt. The resulting sample had a pale blue color which was hard to wipe off.

Various changes and modifications could be made in the process and products of this invention without departing from the spirit and the scope thereof. The various embodiments of the invention disclosed herein serve to further illustrate the invention but are not intended to limit it.

I claim:
1. A process which comprises subjecting a polymeric substrate to elemental white phosphorus to deposit said phosphorus at the surface of said polymeric substrate, partially oxidizing the phosphorus-treated polymeric substrate, hydrolyzing the resulting oxidized surface of said polymeric substrate and thereafter applying an adherent organic coating composition to the resulting hydrophilic surface of the polymeric substrate.
2. The process of claim 1 wherein the organic coating composition is thermoplastic resin, thermosetting resin, adhesive, dye or siccative coating compositions.
3. The process of claim 2 wherein the partial oxidation is conducted in air and the hydrolysis is conducted with water.
4. The process of claim 3 wherein the phosphorus is employed as a solution of the elemental phosphorus dissolved in a solvent.
5. The process of claim 4 wherein the solvent is selected from the group consisting of halogenated hydrocarbons, halocarbons and aromatic hydrocarbons.
6. The process of claim 5 wherein the organic coating composition is a siccative coating composition.
7. The process of claim 5 wherein the organic coating composition is a dye.
8. The process of claim 5 wherein the organic coating composition is an adhesive.
9. An article comprising a polymeric substrate having an organic coating composition adherently bound thereon produced in accordance with the process of claim 1.

References Cited

UNITED STATES PATENTS

| | | | |
|---|---|---|---|
| 2,422,219 | 6/1947 | Amberg et al. | 117—47 |
| 2,486,664 | 11/1949 | Marling et al. | 148—6.15 |
| 3,035,944 | 5/1962 | Sher | 117—47 X |
| 3,099,515 | 7/1963 | Goodings et al. | 117—138.8 X |
| 3,489,585 | 1/1970 | Miller | 117—47 |
| 3,510,327 | 5/1970 | Miller | 117—47 |
| 3,567,649 | 7/1970 | Grumwald | 117—47 A |
| 3,556,956 | 1/1971 | Miller | 117—47 A |

OTHER REFERENCES

Inorganic and Theoretical Chemistry, by J. W. Mellor, chapter XXII, "Silver," vol. III, p. 317.

A Manual of Electro-Metallurgy, by George Shaw, 2nd ed., chapter VII, "On the Preparation of Surfaces for Receiving Metallic Deposits," pp. 91 and 94 (1844).

WILLIAM D. MARTIN, Primary Examiner

W. R. TRENOR, Assistant Examiner

U.S. Cl. X.R.

8—4; 117—72, 76 A, 138.8 E; 148—6.15